(12) United States Patent
Diosdado Borrego et al.

(10) Patent No.: US 11,639,029 B2
(45) Date of Patent: May 2, 2023

(54) LOADING BUILD MATERIAL FOR A 3D PRINTER

(71) Applicant: Hewlett-Packard Development Company, L.P., Spring, TX (US)

(72) Inventors: Jorge Diosdado Borrego, Barcelona (ES); David Chanclon Fernandez, Barcelona (ES); Pablo Antonio Murciego Rodriguez, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/387,668

(22) Filed: Jul. 28, 2021

(65) Prior Publication Data

US 2023/0032693 A1    Feb. 2, 2023

(51) Int. Cl.
| | |
|---|---|
| *B29C 64/321* | (2017.01) |
| *B29C 64/245* | (2017.01) |
| *B29C 64/255* | (2017.01) |
| *B33Y 40/00* | (2020.01) |
| *B29C 64/209* | (2017.01) |
| *B29C 64/236* | (2017.01) |
| *B33Y 30/00* | (2015.01) |
| *B29C 64/214* | (2017.01) |

(52) U.S. Cl.
CPC .......... *B29C 64/321* (2017.08); *B29C 64/209* (2017.08); *B29C 64/214* (2017.08); *B29C 64/236* (2017.08); *B29C 64/245* (2017.08); *B29C 64/255* (2017.08); *B33Y 30/00* (2014.12); *B33Y 40/00* (2014.12)

(58) Field of Classification Search
CPC ... B29C 64/141; B29C 64/153; B29C 64/259; B29C 64/255; B29C 64/307; B29C 64/321; B29C 64/329; B29C 64/336; B29C 64/214
See application file for complete search history.

(56) References Cited

U.S. PATENT DOCUMENTS

2014/0065194 A1 *   3/2014   Yoo ...................... B29C 64/106
                                                        425/375

* cited by examiner

*Primary Examiner* — Joseph S Del Sole
*Assistant Examiner* — Jamel M Nelson
(74) *Attorney, Agent, or Firm* — Shook, Hardy & Bacon L.L.P.

(57) ABSTRACT

In one example, a system for loading build material into a portable build unit having a platform on which objects are printed and a build material supply container next to the platform. The system includes a build material dispenser, a conveyor to move the build unit and/or the dispenser, and a controller operatively connected to the dispenser and the conveyor. The controller is programmed to, with the build unit and the dispenser in a fill position, cause the dispenser to dispense build material into the supply container, cause the conveyor to move the build unit and/or the dispenser to and/or from the fill position, and, while the conveyor moves the build unit and/or the dispenser to and/or from the fill position, cause the dispenser to dispense build material on to the platform.

14 Claims, 10 Drawing Sheets

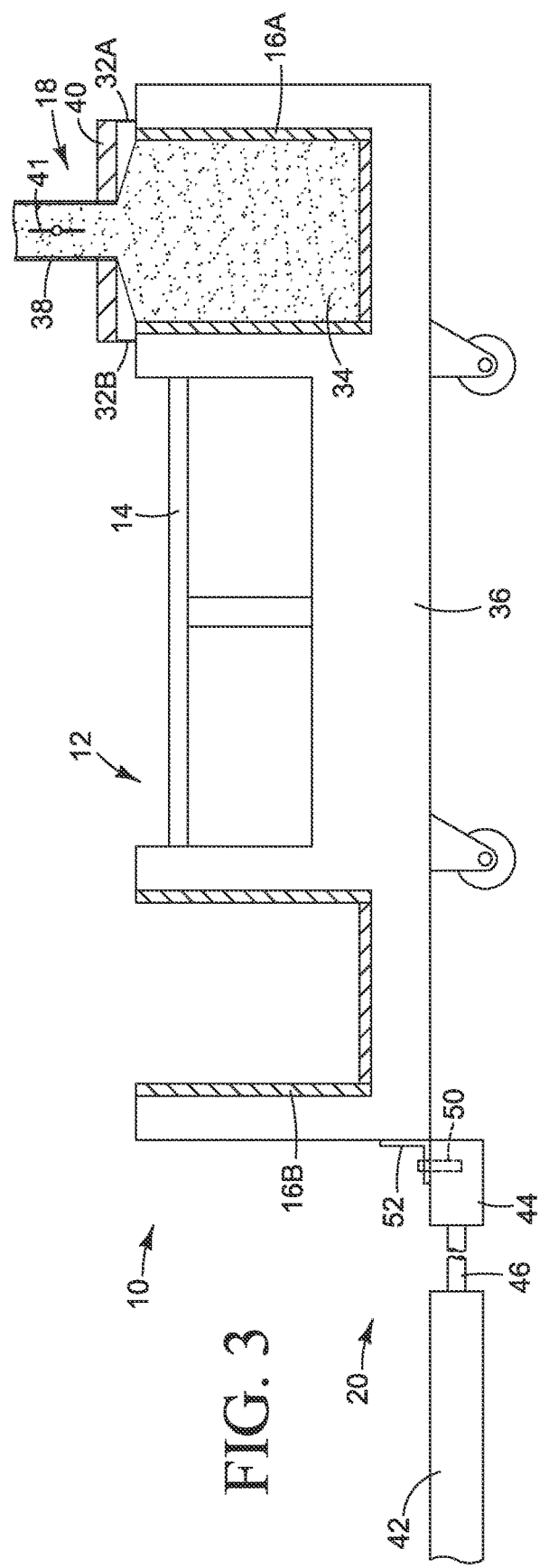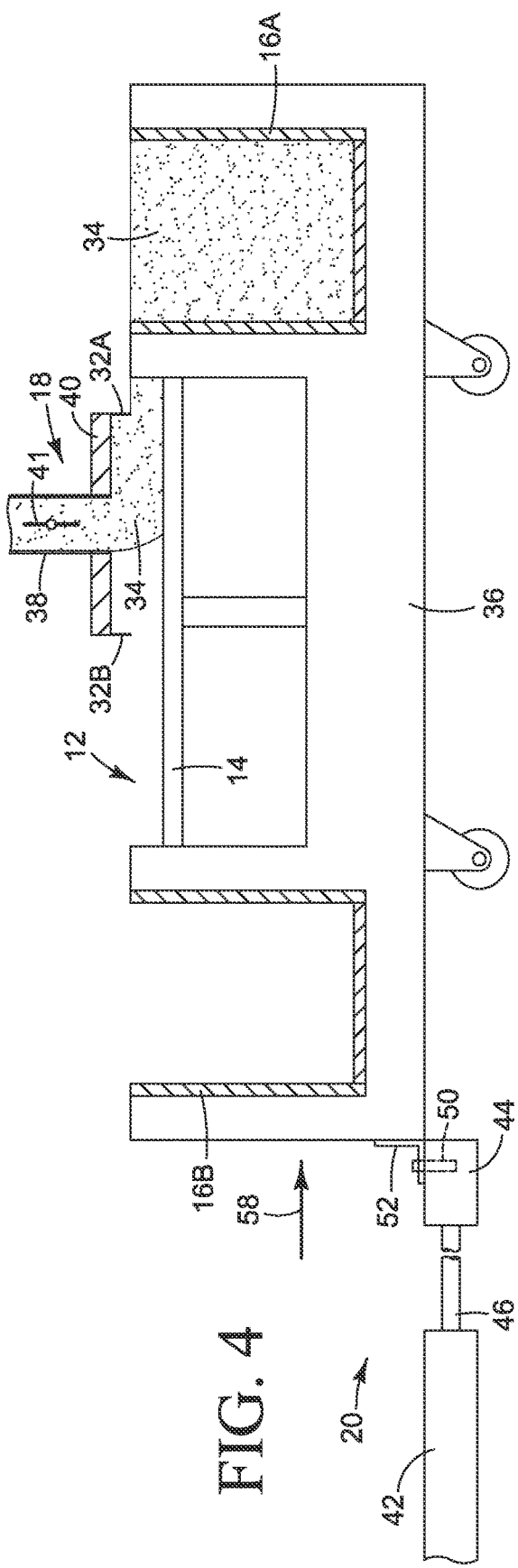

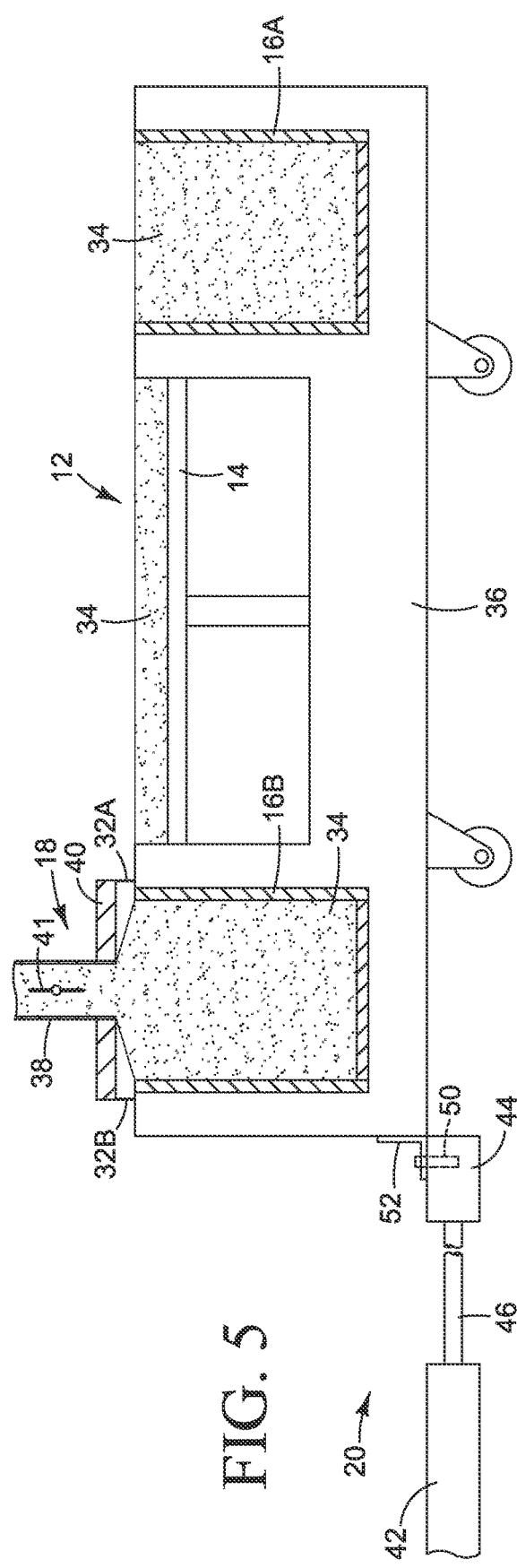
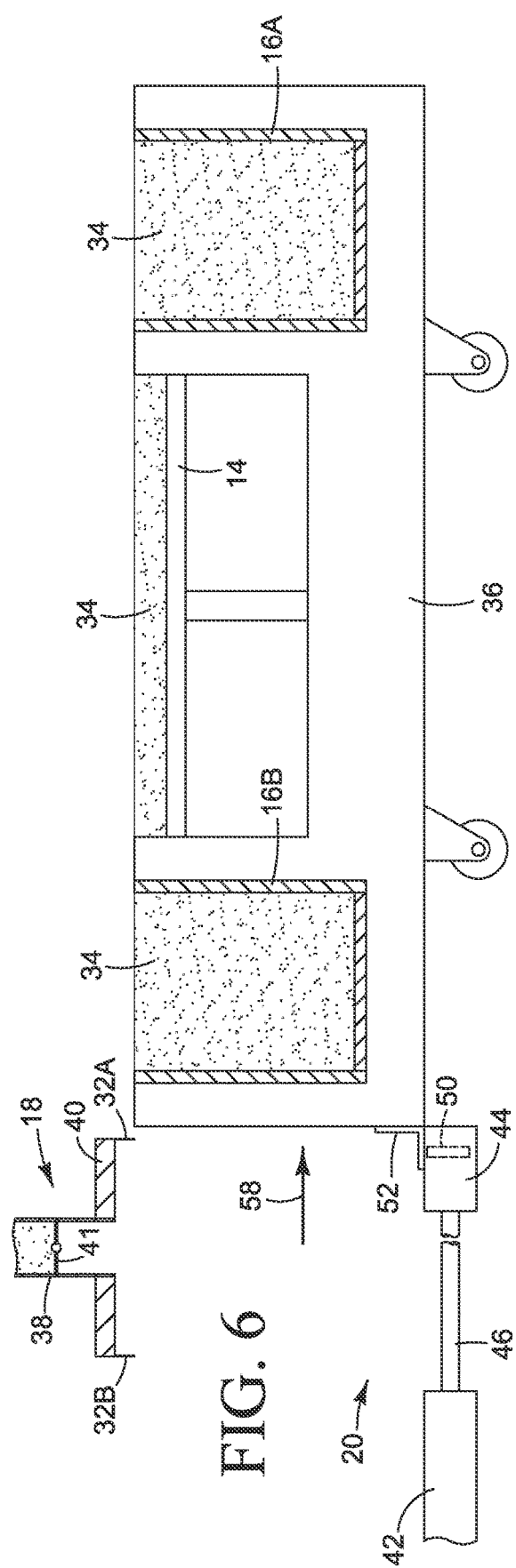

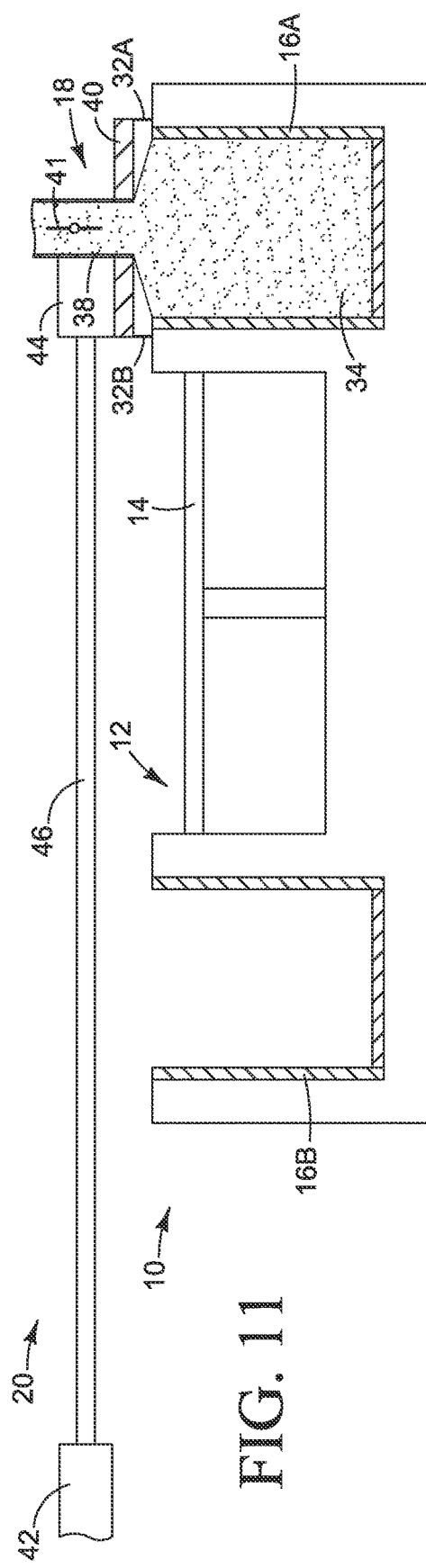
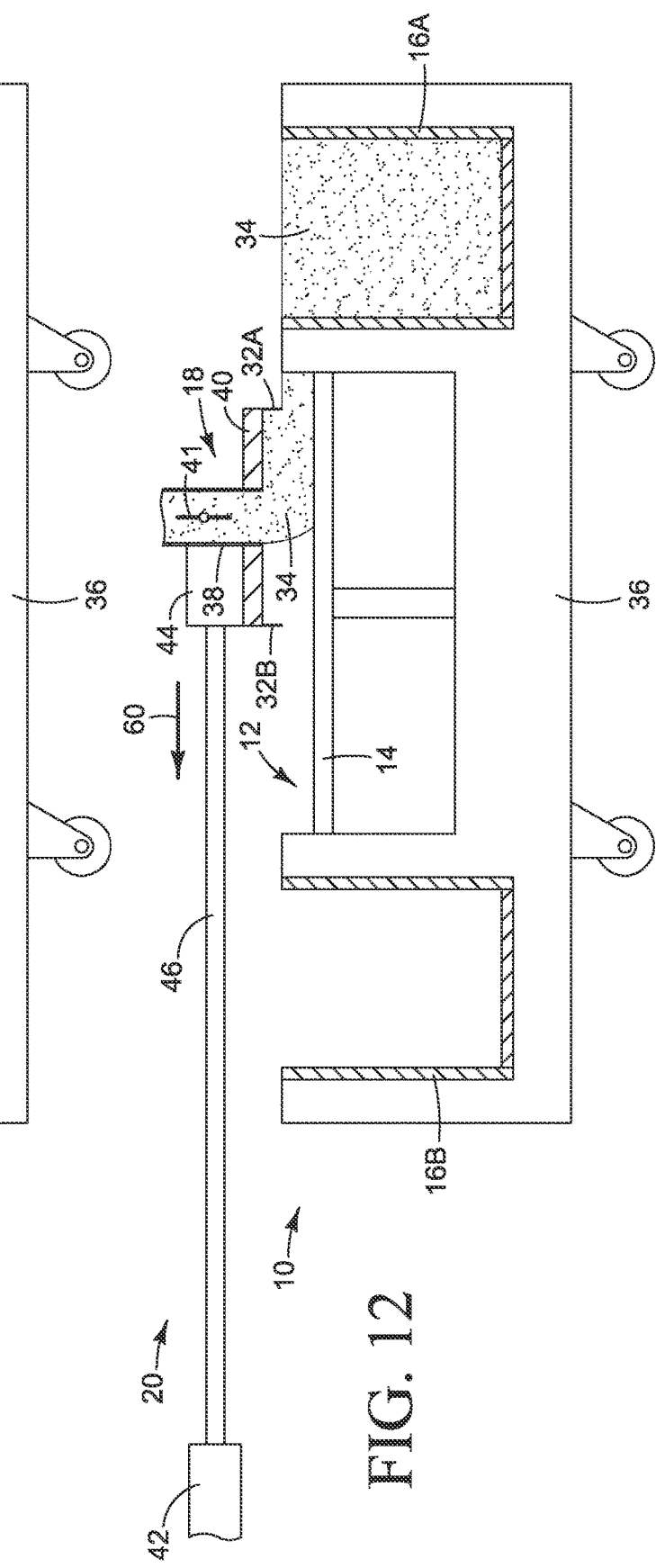

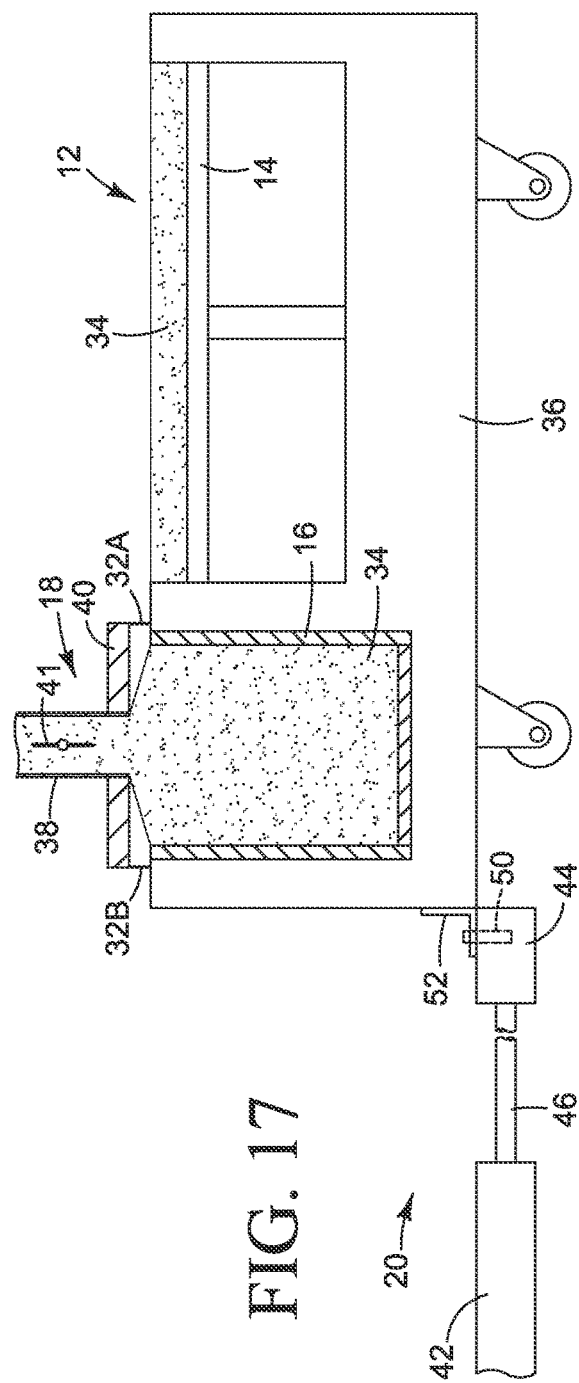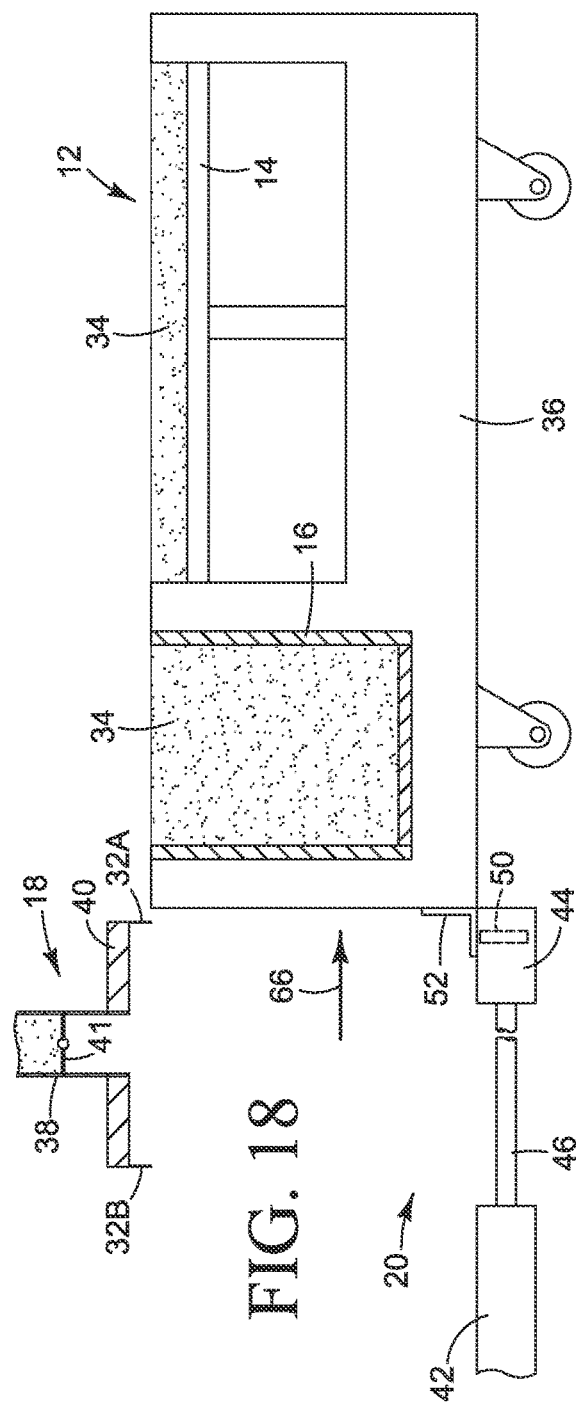

LOADING BUILD MATERIAL FOR A 3D PRINTER

BACKGROUND

Three-dimensional (3D) printers convert a digital representation of an object into a physical object. 3D printing includes any of various processes in which material is bound or solidified under computer control to create a three dimensional object. 3D printing is also commonly referred to as additive manufacturing. 3D printers are often used to manufacture objects with complex geometries using materials such as thermoplastics, polymers, ceramics and metals. In powder based 3D printing, successive layers of a powdered build material are formed and portions of each layer are bound or fused in a desired pattern to build up the object.

DRAWINGS

Figure 7:
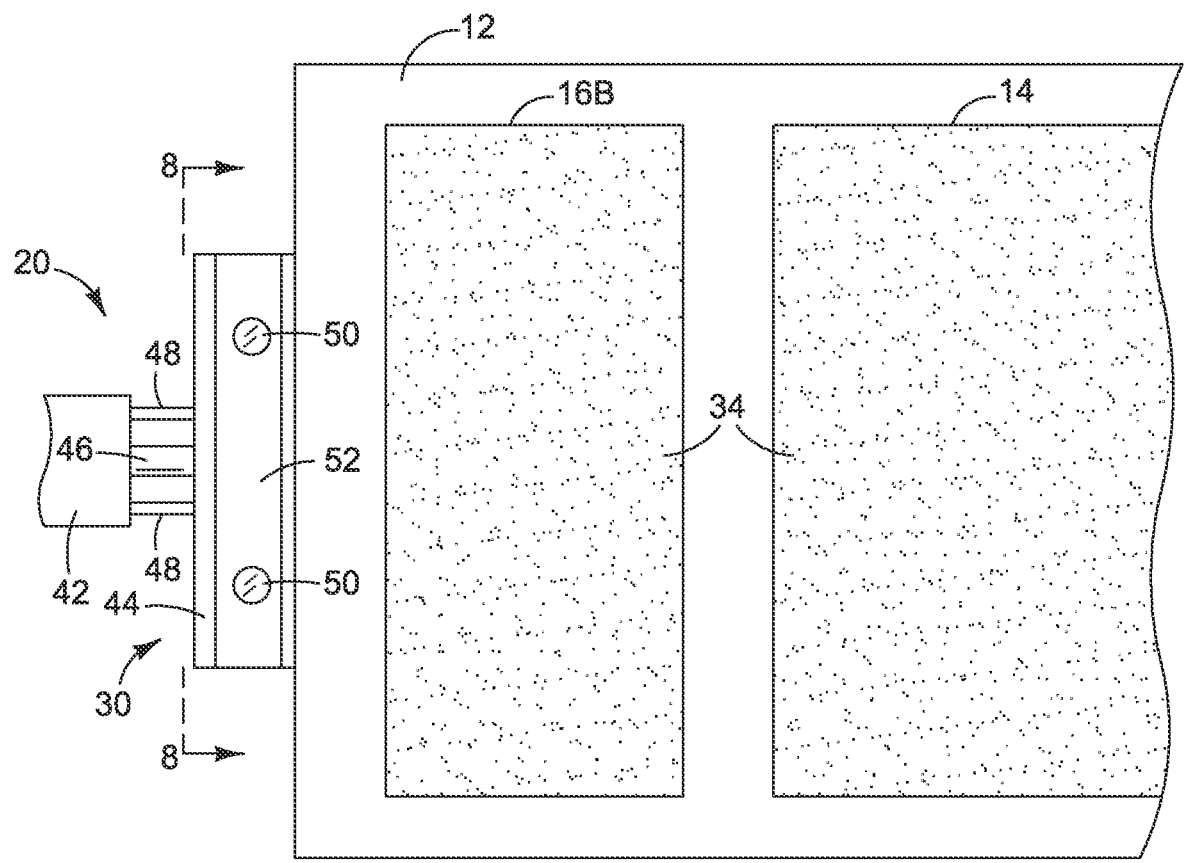
Figure 8:
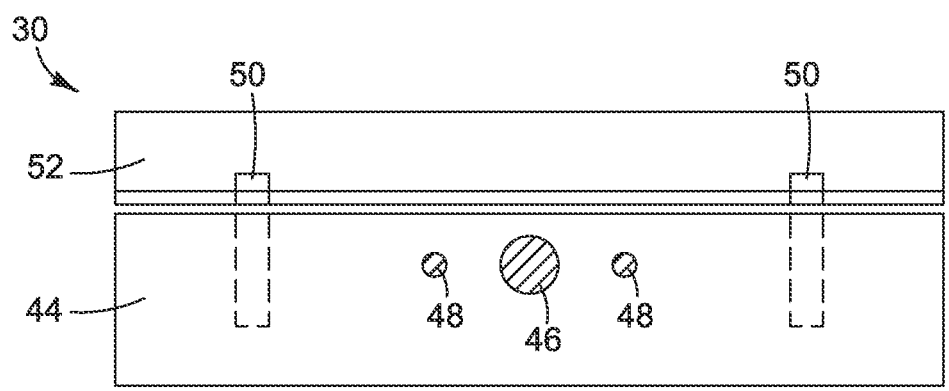
Figure 9:
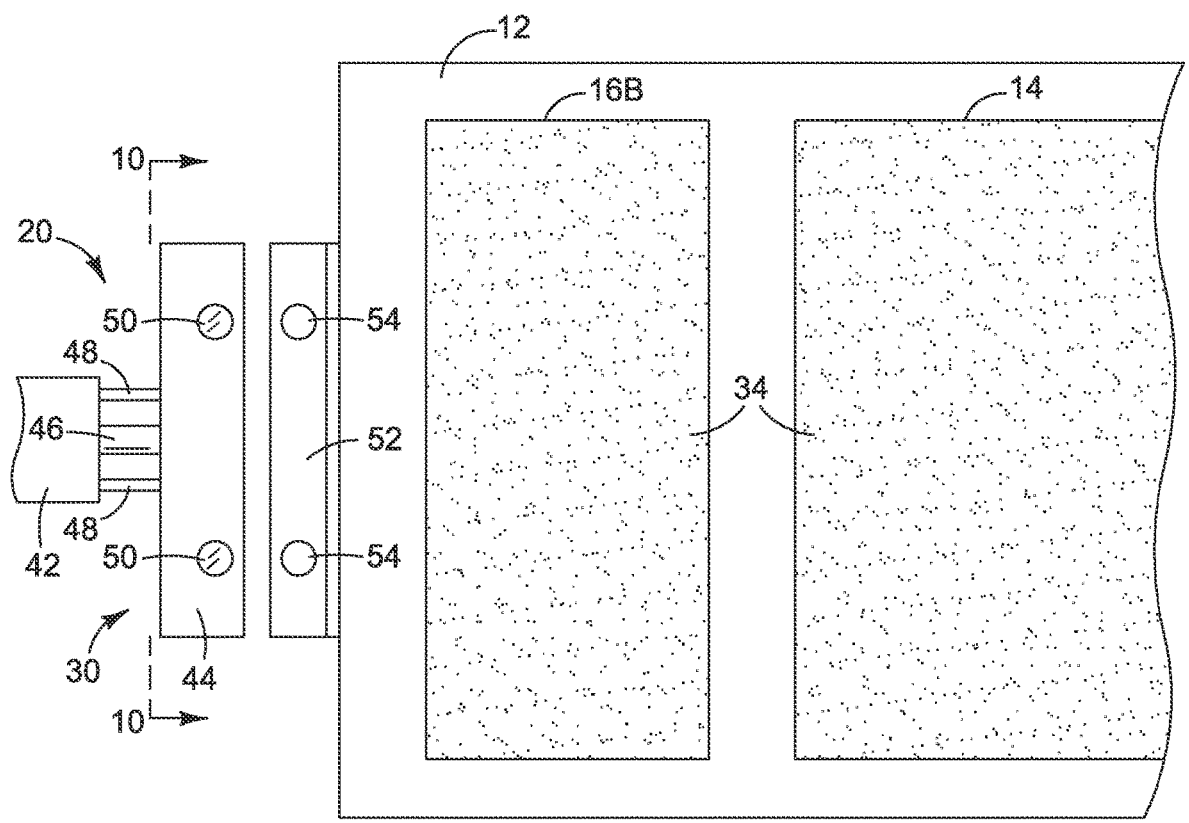
Figure 10:
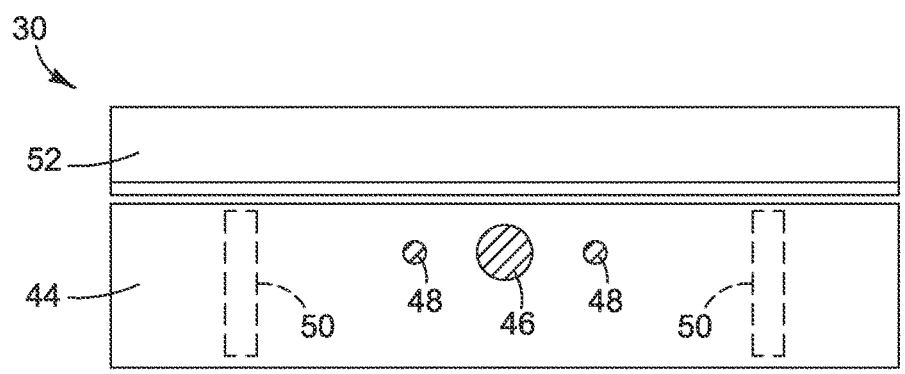

FIGS. 3-10 illustrate an example system for loading build material into a portable build unit for a 3D printer. FIGS. 3-6 are elevation views showing a sequence of operation for the loading system. FIGS. 7 and 8 are plan and section views, respectively, showing a conveyor coupled to the build unit. FIGS. 9 and 10 are plan and section views, respectively, showing conveyor uncoupled from the build unit.

FIGS. 11-14 illustrate another example system for loading build material into a portable build unit for a 3D printer. FIGS. 11-14 are elevation views showing a sequence of operation for the loading system.

FIGS. 15-18 illustrate another example system for loading build material into a portable build unit for a 3D printer. FIGS. 15-18 are elevation views showing a sequence of operation for the loading system.

Figure 19:
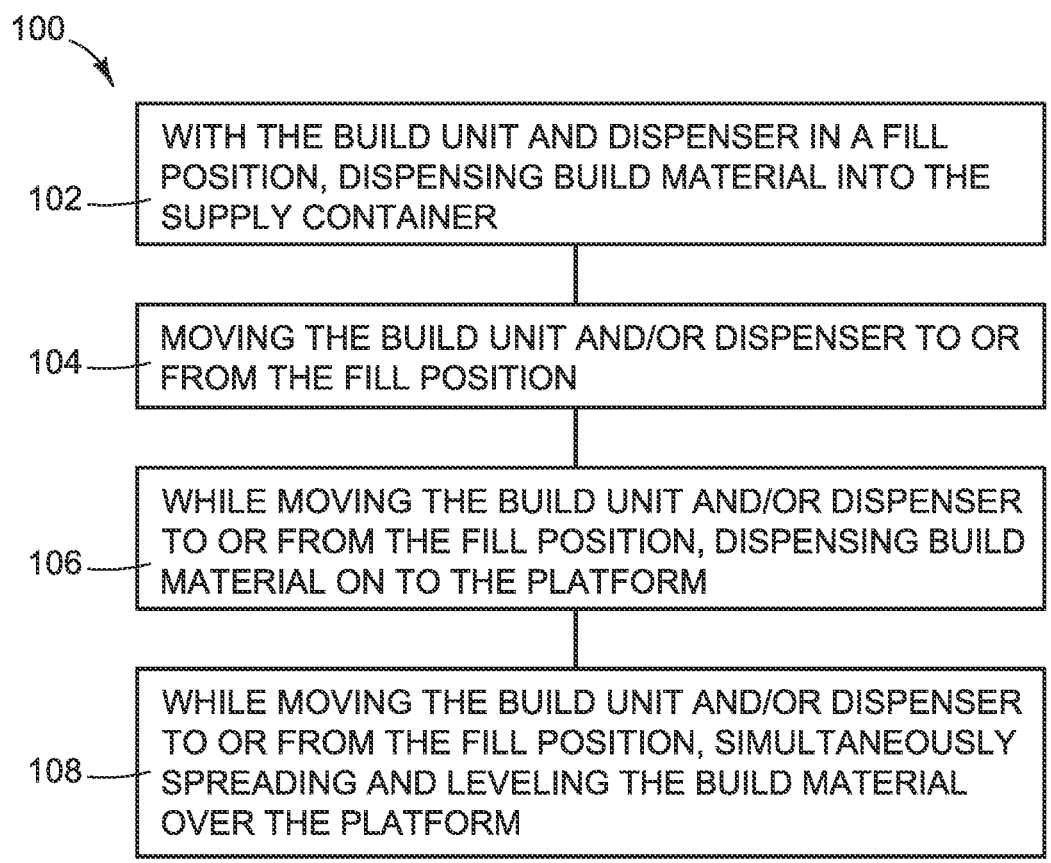

FIG. 19 illustrates an example process for loading build material into a build unit for a 3D printer.

The same part numbers refer to the same or similar parts throughout the figures. The figures are not necessarily to scale.

DESCRIPTION

Metal objects may be printed by selectively applying a liquid binder to portions of each of successive layers of metal powder corresponding to a solid layer of the 3D object. The binder is cured, for example using heat and/or ultraviolet light, to hold the metal powder particles together in the desired shape. The cured object, known commonly as a "green part," is heated in a sintering furnace to fuse the metal particles. Polymer objects may be printed by selectively applying a liquid, energy absorbing fusing agent to portions of each of successive layers of polymer powder and exposing the treated powder in each layer to light, heat and/or other electromagnetic radiation, causing the treated powder to heat up, coalesce, and fuse as part of the printing process.

In some 3D printing systems, objects are printed on a platform in a build chamber that is part of a portable build unit that also includes a build material supply container next to the platform. The build unit may include a single supply container on only one side of the build platform or multiple supply containers on two (or more) sides of the build platform. Build material is often loaded into the supply container(s) at a loading station separate from the printer. Build material is loaded into a build unit at the loading station and then moved to the printer for printing.

In some 3D printing processes, a base of unprinted build material is formed before starting to print the object itself by spreading layers of build material over the build platform. The base may include tens or even hundreds of layers of build material. In order to avoid the time and expense of building up the base layer by layer in the printer, a new system has been developed to automatically form the base while loading the build material supply container(s). In one example, the build unit is coupled to a conveyor at the loading station to move the build unit under a build material dispenser at the direction of a controller programmed with the desired operating sequence. For example, with the build unit in a fill position, build material is dispensed into a supply container on one side of the build platform. Once the supply container is filled, the conveyor moves the build unit away from the fill position so that the build platform passes under the dispenser. Build material is dispensed on to the passing platform to form the desired base of unprinted build material. A leveling blade may be attached to the trailing side of the dispenser to spread and level the build material uniformly over the passing platform, as well as to level the build material loaded into the supply container as the supply container passes under the blade.

If the build unit includes a second supply container, the conveyor moves the build unit to a second fill position in which the second supply container is positioned under the dispenser and build material is dispensed into the second supply container. Once the supply container is filled, the conveyor moves the build unit away from the second fill position so that the leveling blade levels the build material loaded into the second supply container. The build unit may then be decoupled from the conveyor, removed from the loading station, and returned to the printer to print the next batch of objects on the base.

These and other examples shown in the figures and described below illustrate the claimed subject matter but do not limit the scope of the patent, which is defined by the Claims following this Description.

As used in this document: "and/or" means at least one of the connected things; and a "computer readable medium" means any non-transitory tangible medium that can embody, contain, store, or maintain programming for use by a computer processor and may include, for example, circuits, integrated circuits, ASICs (application specific integrated circuits), hard drives, random access memory (RAM), and read-only memory (ROM).

Figure 1:
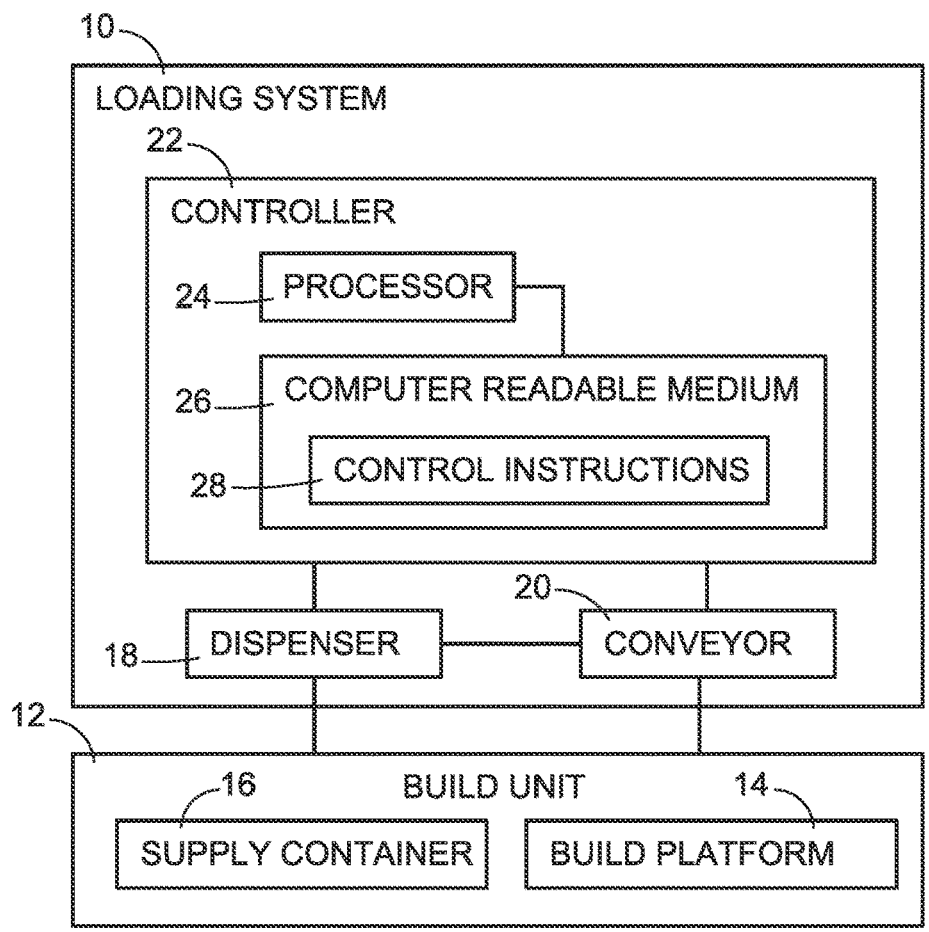
FIG. 1 illustrates an example system for loading build material into a build unit for a 3D printer.

FIG. 1 illustrates an example system 10 for loading build material into a portable build unit 12 for a 3D printer. The build unit has a "build" platform 14 on which objects are printed and a build material supply container 16 next to platform 14. Referring to FIG. 1, loading system 10 includes a dispenser 18 to dispense a powdered or other build material into supply container 16 and onto build platform 14, and a conveyor 20 to move build unit 12 and/or dispenser 18. System 10 also includes a controller 22 operatively connected to dispenser 18 and conveyor 20. Controller 22 includes the programming, processing and associated memory resources, and the other electronic circuitry and components to control the operative elements of system 10. Controller 22 may include distinct control elements for individual system components. In particular, controller 22 in FIG. 1 includes a processor 24 and a computer readable medium 26 with system control instructions 28 operatively connected to processor 24.

Control instructions 28 represent programming that enables controller 22 to control dispenser 18 and conveyor 20 during loading operations. In one example, processor 24 executing instructions 28 on controller 22 causes a stationary dispenser 18 to, with build unit 12 in a fill position, dispense build material into supply container 16, causes conveyor 20 to move build unit 12 to and/or away from the fill position and, while conveyor 20 is moving build unit 12 to and/or away from the fill position, causes dispenser 18 to dispense build material on to platform 14. In another example, processor 24 executing instructions 28 on controller 22 causes a movable dispenser 18 in a fill position to dispense build material into supply container 16 in a stationary build unit 12, causes conveyor 20 to move dispenser 18 to and/or away from the fill position and, while conveyor 20 is moving dispenser 18 to and/or away from the fill position, causes dispenser 18 to dispense build material on to platform 14. In another example, processor 24 executing instructions 28 on controller 22 causes a movable dispenser 18 in a fill position to dispense build material into supply container 16 in a movable build unit 12, causes conveyor 20 to move both build unit 12 and dispenser 18 to and/or away from the fill position and, while conveyor 20 is moving build unit 12 and dispenser 18 to and/or away from the fill position, causes dispenser 18 to dispense build material on to platform 14.

"Stationary" as used in this document means stationary in the direction build unit 12 and/or dispenser 18 move to and/or away from the fill position during a dispensing operation. Thus, a "stationary" dispenser 18 or a "stationary" build unit 12 may be moved in other directions and/or at other times. For example, a portable build unit 12 that is stationary during dispensing may be moved into position below dispenser 18, remain stationary during dispensing, and then moved away from dispenser 18 after dispensing is completed.

Figure 2:
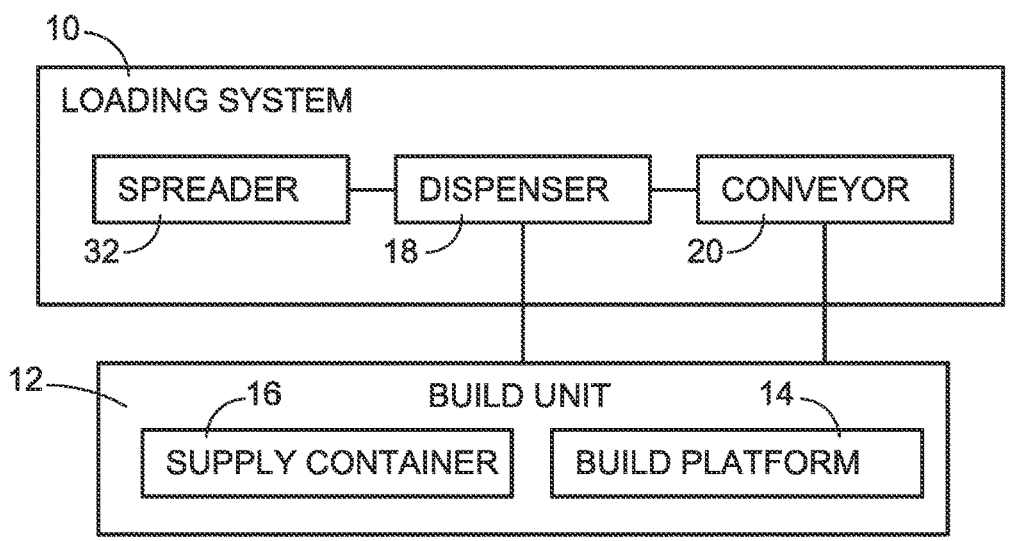
FIG. 2 illustrates an example system for loading build material into a build unit for a 3D printer.

In the example shown in FIG. 2, loading system 10 includes a spreader 32 attached to dispenser 18. A blade, roller, or other suitable spreader 32 spreads build material over platform 14 as conveyor 20 moves build unit 12 and/or dispenser 18 to and/or away from a fill position.

FIGS. 3-10 illustrate an example system 10 for loading build material powder into a portable build unit 12 for a 3D printer. FIGS. 3-6 are elevation views showing a sequence of operation for system 10. FIGS. 7 and 8 are plan and section views showing a conveyor 20 coupled to build unit 12. FIGS. 9 and 10 are plan and section views showing conveyor 20 uncoupled from build unit 12.

Referring to FIGS. 3-10, build unit 12 includes a build platform 14, a first supply container 16A along one side of platform 14, and a second supply container 16B along the opposite side of platform 14. In the printer, objects are printed on platform 14 layer by layer using build material 34 from supply containers 16A and 16B. Platform 14 is moved down incrementally during printing for each new layer of build material. The bottom of a respective one of the supply containers 16A, 16B is moved up incrementally for each new layer to present build material 34 to a layering device that moves back and forth to layer build material over platform 14. In the example shown in FIGS. 3-10, platform 14 and containers 16A, 16B are mounted in a wheeled cart 36 for moving build unit 12 between a printing station and a loading station.

Loading system 10 in FIGS. 3-10 includes a dispenser 18 to dispense build material 34 into supply containers 16A, 16B and onto build platform 14, and a conveyor 20 to move build unit 12 between fill positions. Dispenser 18 includes a conduit 38 coupled to a base 40. Build material 34 is pumped or otherwise delivered to conduit 38 from a build material store (not shown). Dispenser 18 may include a valve 41 to regulate the flow of build material 34 through conduit 38, for example at the direction of a controller 22 shown in FIG. 1. Other implementations for a dispenser 18 are possible. In this example, conveyor 20 is implemented as a pneumatic cylinder 42 that includes a carriage 44 mounted to a piston rod 46 and guide rods 48. Pneumatic cylinder 42 extends and retracts piston rod 46 to move carriage 44 and thus cart 36 and build unit 12. Other suitable drive mechanisms for a conveyor 20 are possible including, for example, a hydraulic cylinder, a conveyor belt, and a lead screw.

Loading system 10 also includes a coupler 30 that moves between an engaged position in which build unit 12 is coupled to conveyor 20 and a disengaged position in which build unit 12 is not coupled to conveyor 20. Coupler 30 is engaged in FIGS. 3-5, 7 and 8 and disengaged in FIGS. 6, 9 and 10. In this example, coupler 30 includes pins 50 on conveyor carriage 44 and a receiver 52 on cart 36. Pins 50 extend into holes 54 in receiver 52 to couple conveyor 20 to build unit 12 as shown in FIGS. 3-5, 7 and 8, and retract (or are removed) from holes 54 in receiver 52 to uncouple conveyor 20 from build unit 12 as shown in FIGS. 6, 9, and 10. Holes 54 are called out in FIG. 9.

In FIG. 3, build unit 12 and dispenser 18 are in a first fill position with first supply container 16A under dispenser 18, valve 41 in conduit 38 is open, and build material 34 is dispensed into container 16A. Build unit 12 may be moved into the position shown in FIG. 3 under a stationary dispenser 18, for example, by a user wheeling cart 36 into position or automatically by engaging coupler 30 and moving conveyor 20. In FIG. 4, dispenser 18 dispenses and spreader 32 spreads build material 34 over platform 14 as conveyor 20 moves build unit 12 away from the first fill position toward a second fill position, as indicated by arrow 56, by extending piston rod 46. In FIG. 5, conveyor 20 has moved build unit 12 to the second fill position with second supply container 16B under dispenser 18 and build material 34 is dispensed into container 16B. In FIG. 6, valve 41 is closed to stop dispensing build material 34, conveyor 20 has moved build unit to a position clear of dispenser 18, as indicated by arrow 58, and coupler pins 50 are retracted to uncouple conveyor 20 from build unit 12 so that cart 36 and thus build unit 12 can be wheeled away from the loading station.

FIGS. 11-14 illustrate another example system 10 for loading build material powder into a portable build unit 12 for a 3D printer. Referring to FIGS. 11-14, build unit 12 includes a build platform 14, a first supply container 16A along one side of platform 14, and a second supply container 16B along the opposite side of platform 14. In the example shown in FIGS. 11-14, platform 14 and containers 16A, 16B are mounted in a wheeled cart 36 for moving build unit 12 between a printing station and a loading station.

Loading system 10 in FIGS. 11-14 includes a dispenser 18 to dispense build material 34 into supply containers 16A, 16B and onto build platform 14, and a conveyor 20 to move dispenser 18 between fill positions. Dispenser 18 includes a conduit 38 coupled to a base 40. Build material 34 is pumped or otherwise delivered to conduit 38 from a build material store (not shown). Dispenser 18 may include a valve 41 to regulate the flow of build material 34 through conduit 38, for example at the direction of a controller 22 shown in FIG. 1. In this example, conveyor 20 is implemented as a pneumatic cylinder 42 that includes a carriage 44 mounted to a piston rod 46. Pneumatic cylinder 42 extends and retracts piston rod 46 to move carriage 44 and thus dispenser 18. Other suitable implementations for a conveyor 20 are possible including, for example, a hydraulic cylinder, a conveyor belt, and a lead screw.

Figure 13:
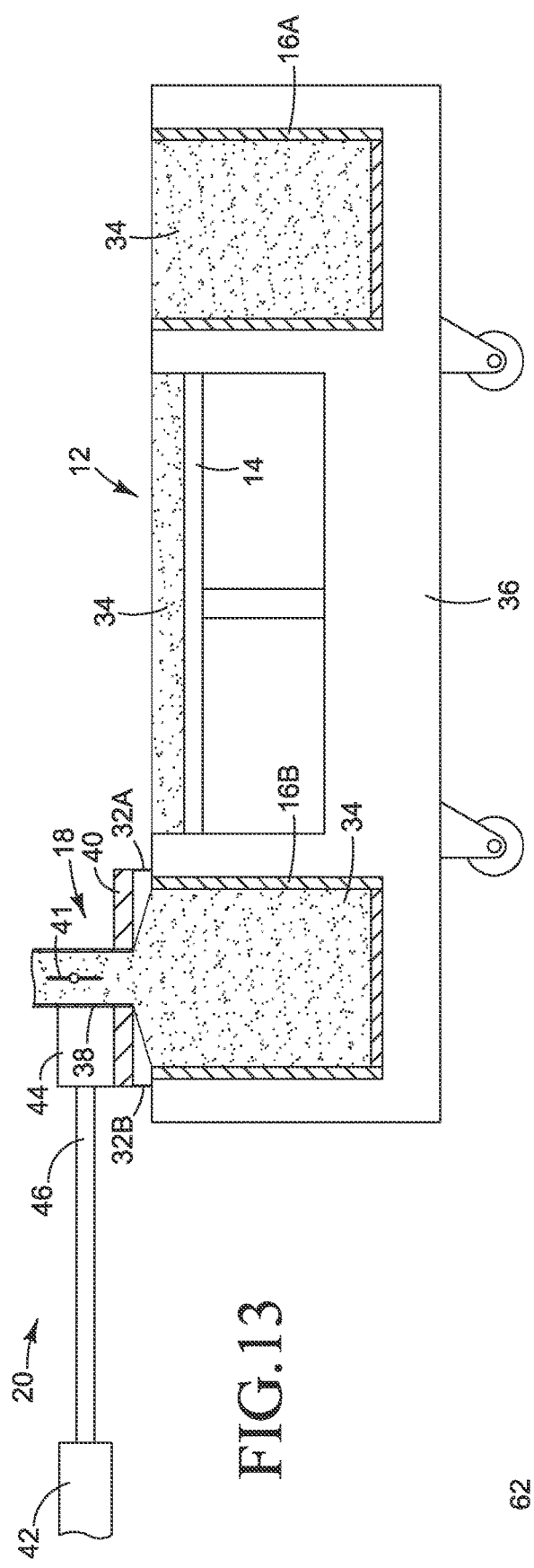
Figure 14:
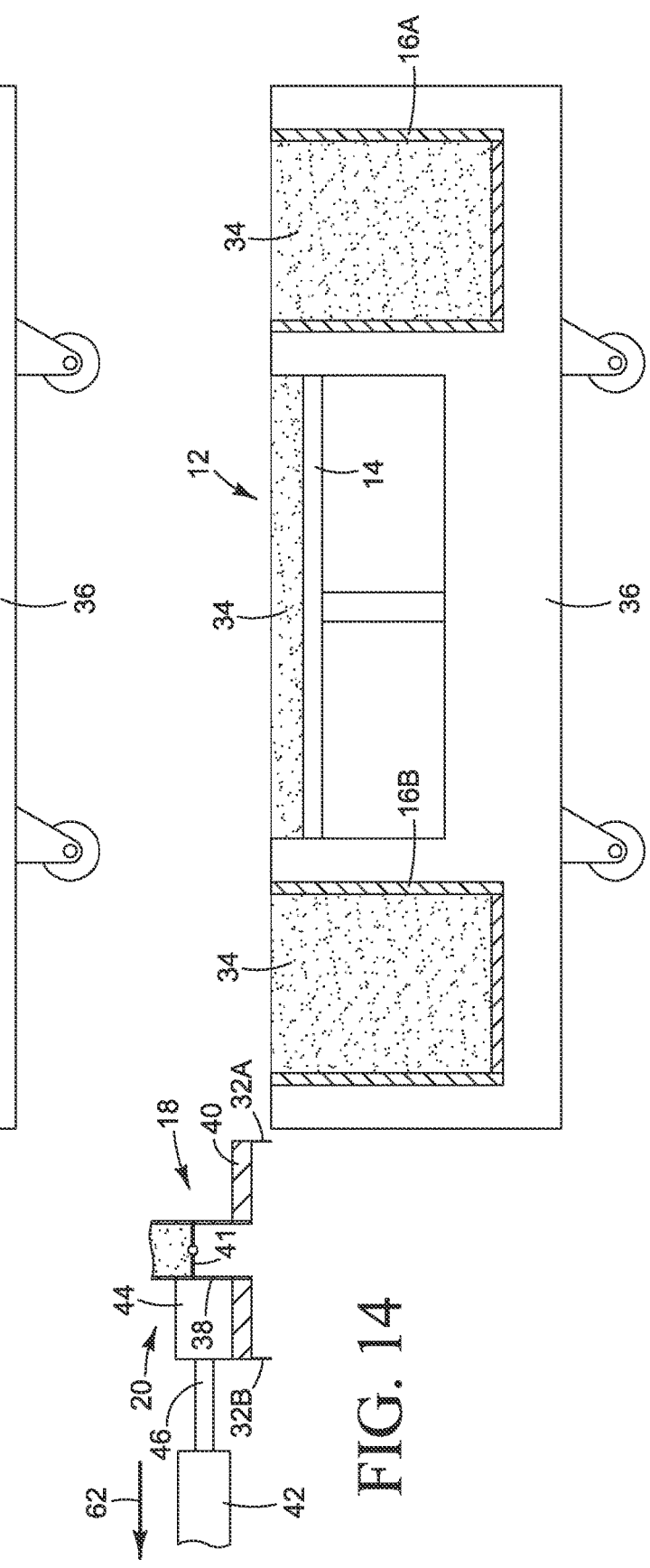

In FIG. 11, build unit 12 and dispenser 18 are in a first fill position with dispenser 18 over first supply container 16A, valve 41 in conduit 38 is open, and build material 34 is dispensed into container 16A. Dispenser 18 may be moved into the position shown in FIG. 11, for example, at the urging of conveyor 20. Build unit 12 may be moved into the position shown in FIG. 11, for example, by a user wheeling cart 36 into position. In FIG. 12, dispenser 18 dispenses and spreader 32 spreads build material 34 over platform 14 as conveyor 20 moves dispenser 18 away from the first fill position toward a second fill position, as indicated by arrow 60, by retracting piston rod 46. In FIG. 13, conveyor 20 has moved dispenser 18 to the second fill position over second supply container 16B and build material 34 is dispensed into container 16B. In FIG. 14, valve 41 is closed to stop dispensing build material 34, conveyor 20 has moved dispenser 18 to a position clear of dispenser 18, as indicated by arrow 62, and cart 36 with build unit 12 can be wheeled away from the loading station.

In the examples shown in FIGS. 3-14, spreader 32 is implemented as a blade 32A mounted along one side of dispenser 18 so that blade 32A trails dispenser 18 over platform 14 and containers 16A, 16B. Blade 32A spreads build material 34 over platform 14 and levels the build material in platform 14 and containers 16A, 16B. Spreader 32 may include a second blade 32B along another side of dispenser 18 opposite blade 32A so that a spreader blade trails dispenser 18 in both directions across platform 14 and containers 16A, 16B. In some implementations, it is desirable that the containment volume above platform 14 and in containers 16A, 16B is filled completely and leveled to make a uniform surface free of pits, pockets, voids, and other variations, as can be seen in FIGS. 6, 7, and 14. The depth of build material 34 on platform 14 may be controlled by adjusting the height of platform 14. Position sensors may be used to signal a controller 22 in FIG. 1 to start and stop conveyor 20 and dispenser 18 based on the position of build unit 12.

Although build unit 12 includes two supply containers 16A, 16B in FIGS. 3-14, more or fewer supply containers could be used. Also, other loading sequences are possible. For example, supply container 16B could be loaded first. For another example, each supply container 16A, 16B could be loaded after dispensing and spreading build material 34 over platform 14. For another example, both supply containers 16A, 16B could be filled simultaneously with respective dispensers and build material dispensed on to platform 14 with one of the dispensers and spread and leveled with a blade attached to the dispenser as the build unit is moved away from the dual fill position.

FIGS. 15-18 illustrate another example system 10 for loading build material powder into a portable build unit 12 for a 3D printer. Referring to FIGS. 15-18, build unit 12 includes a build platform 14 and a supply container 16 along one side of platform 14. Platform 14 and container 16 are mounted in a wheeled cart 36 for moving build unit 12 between a printing station and a loading station. Loading system 10 in FIGS. 15-18 includes a dispenser 18 to dispense build material 34 into supply container 16 and onto build platform 14, and a conveyor 20 to move build unit 12 across platform 14 to a fill position. Dispenser 18 includes a conduit 38 coupled to a base 40. Build material 34 is pumped or otherwise delivered to conduit 38 from a build material store (not shown). Dispenser 18 may include a valve 41 to regulate the flow of build material 34 through conduit 38, for example at the direction of a controller 22 shown in FIG. 1.

Figure 15:
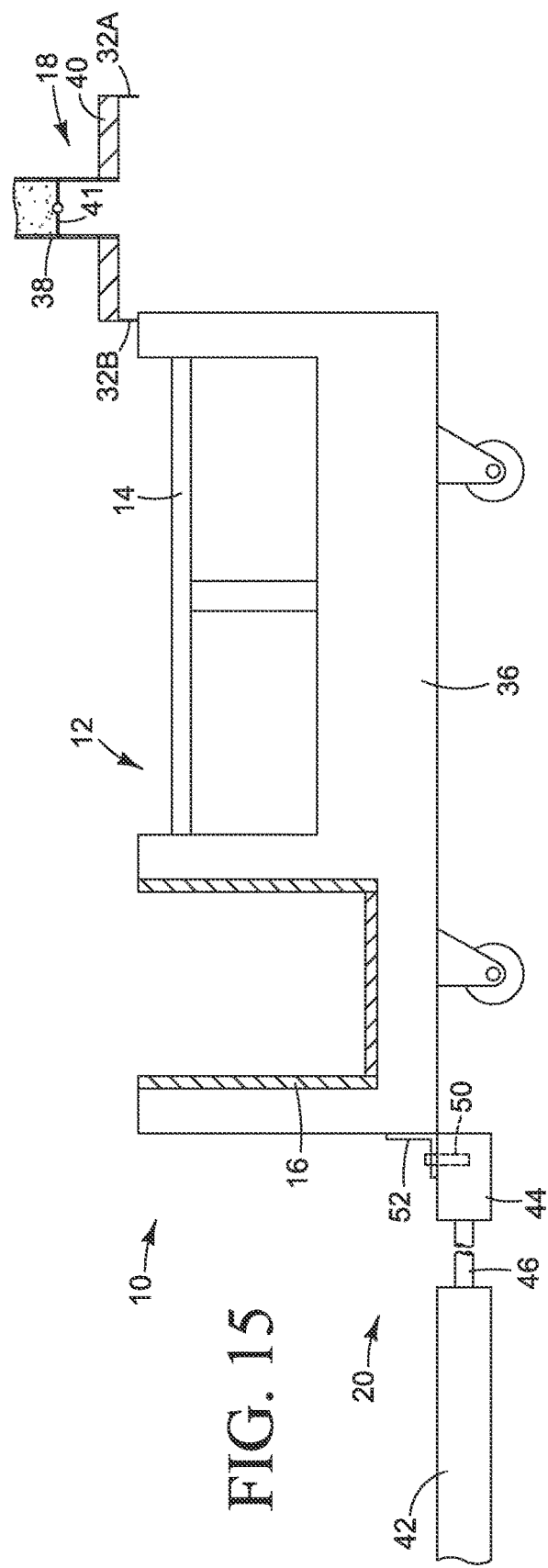
Figure 16:
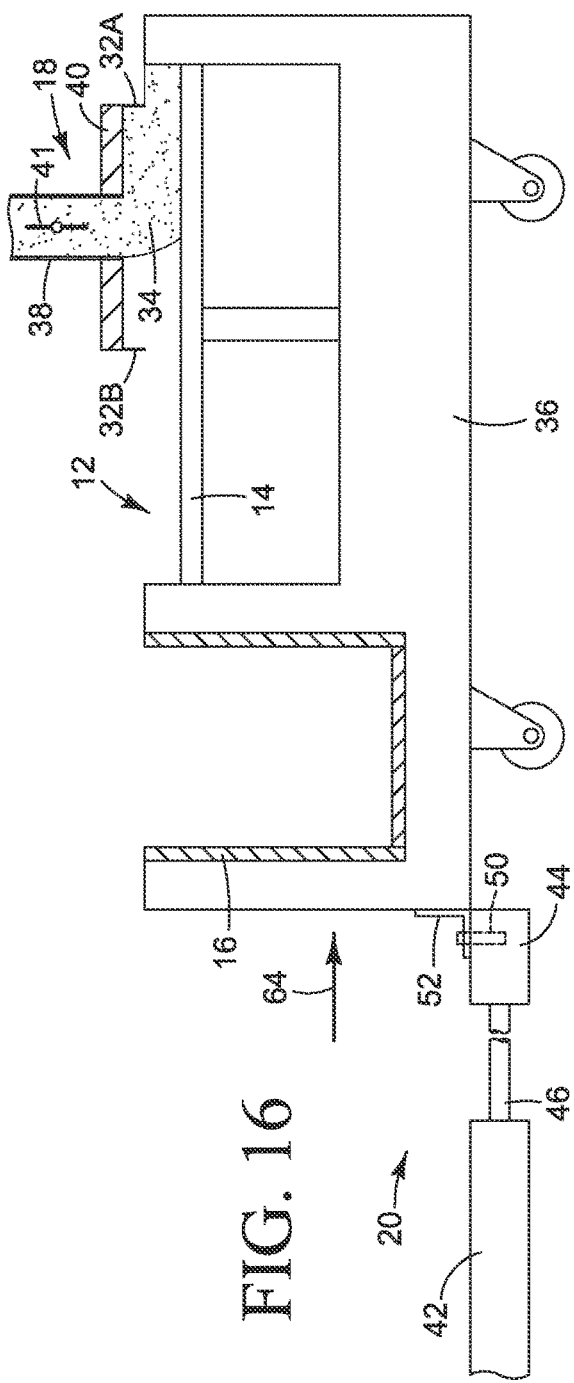

In FIG. 17, build unit 12 and dispenser 18 are in a fill position with supply container 16 under dispenser 18, valve 41 in conduit 38 is open, and build material 34 is dispensed into container 16. As shown in FIGS. 15 and 16, dispenser 18 dispenses and spreader 32 spreads build material 34 over platform 14 as conveyor 20 moves build unit 12 toward the fill position shown in FIG. 17, as indicated by arrow 64 in FIG. 16, by extending piston rod 46. In FIG. 17, conveyor 20 has moved build unit 12 to the fill position. In FIG. 18, valve 41 is closed to stop dispensing build material 34, conveyor 20 has moved build unit to a position clear of dispenser 18, as indicated by arrow 66, and coupler pins 50 are retracted to uncouple conveyor 20 from build unit 12 so that build unit 12 on cart 36 can be wheeled away from the loading station.

FIG. 19 illustrates one example of a process 100 for loading build material into a build unit for a 3D printer, such as might be implemented by a controller 22 in FIG. 1 executing control instructions 28. The build unit includes a platform on which objects are printed and a build material supply container next to the platform. Referring to FIG. 19, process 100 includes, with the build unit and dispenser in a fill position, dispensing build material into the supply container (block 102), for example as shown in FIGS. 3, 11, and 17, moving the build unit and/or dispenser to and/or from the fill position (block 104), and, while moving the build unit and/or dispenser to and/or from the fill position, dispensing build material on to the platform (block 106), for example as shown in FIGS. 4, 12, and 16. Process 100 may also include, while moving the build unit and/or dispenser to and/or from the fill position, simultaneously spreading and leveling the build material over the platform (block 106), for example as shown in FIGS. 4, 12, and 16.

The invention claimed is:

1. A system for loading build material into a portable build unit for a 3D printer, the build unit having a platform on which objects are printed and a build material supply container next to the platform, the system comprising:
   a build material dispenser;
   a conveyor to move the build unit and/or the dispenser; and
   a controller operatively connected to the dispenser and the conveyor and programmed to:
   with the build unit and the dispenser in a fill position, cause the dispenser to dispense build material into the supply container;
   cause the conveyor to move the build unit and/or the dispenser to and/or from the fill position; and
   while the conveyor moves the build unit and/or the dispenser to and/or from the fill position, cause the dispenser to dispense build material on to the platform.

2. The system of claim 1, wherein:
   the supply container comprises a first supply container on one side of the platform and a second supply container opposite the first supply container on another side of the platform;
   the controller programmed to cause the dispenser to dispense build material into the supply container comprises the controller programmed to:
   with the build unit and the dispenser in a first fill position, cause the dispenser to dispense build material into the first supply container; and with the build unit and the dispenser in a second fill position, cause the dispenser to dispense build material into the second supply container;

the controller programmed to cause the conveyor to move the build unit and/or the dispenser to and/or from the fill position comprises the controller programmed to cause the conveyor to move the build unit and/or the dispenser from the first fill position to the second fill position and/or from the second fill position to the first fill position; and the controller programmed to cause the dispenser to dispense build material on to the platform comprises the controller programmed to, while the conveyor moves the build unit and/or the dispenser from the first fill position to the second fill position and/or from the second fill position to the first fill position, cause the dispenser to dispense build material on to the platform.

3. The system of claim 1, comprising a coupler to couple the build unit to the conveyor and to decouple the build unit from the conveyor.

4. The system of claim 3, wherein the conveyor comprises a pneumatic cylinder operatively connected to the coupler to move the build unit coupled to the coupler to and/or from the fill position at the direction of the controller.

5. The system of claim 1, comprising a spreader to spread build material over the platform while the build unit and/or the dispenser is moved to and/or from the fill position.

6. The system of claim 5, wherein the spreader comprises a blade attached to the dispenser.

7. A system for loading build material into a portable build unit for a 3D printer, the build unit having a platform on which objects are printed, a first supply container on one side of the platform, and a second supply container opposite the first supply container on another side of the platform, the system comprising:

a build material dispenser to dispense build material into the first supply container and into the second supply container;

a conveyor to move the build unit from a first fill position in which the first supply container is under the dispenser to a second fill position in which the second supply container is under the dispenser;

a coupler to couple the build unit to the conveyor and to decouple the build unit from the conveyor; and a spreader to spread build material over the platform while the build unit is moved from the first fill position to the second fill position.

8. The system of claim 7, wherein the spreader comprises a blade attached to the dispenser.

9. The system of claim 7, comprising a controller operatively connected to the dispenser and the conveyor and programmed to:

with the build unit in the first fill position, cause the dispenser to dispense build material into the first supply container;

with the build unit in the second fill position, cause the dispenser to dispense build material into the second supply container;

cause the conveyor to move the build unit from the first fill position to the second fill position; and while the conveyor moves the build unit from the first fill position to the second fill position, cause the dispenser to dispense build material on to the platform.

10. A process for loading build material into a build unit for a 3D printer, the build unit having a platform on which objects are printed and a build material supply container next to the platform, the process comprising:

with the build unit and the dispenser in a fill position, dispensing build material into the supply container;

moving the build unit and/or the dispenser to and/or from the fill position; and while moving the build unit and/or the dispenser to and/or from the fill position, dispensing build material on to the platform.

11. The process of claim 10, wherein:

the supply container comprises a first supply container on one side of the platform and a second supply container opposite the first supply container on another side of the platform;

dispensing build material into the supply container comprises:

with the build unit and the dispenser in a first fill position, dispensing build material into the first supply container; and with the build unit and the dispenser in a second fill position, dispensing build material into the second supply container; and dispensing build material on to the platform comprises, while moving the build unit and/or the dispenser from the first fill position to the second fill position and/or from the second fill position to the first fill position, dispensing build material on to the platform.

12. The process of claim 10, comprising, while dispensing build material on to the platform, spreading the build material over the platform.

13. The process of claim 12, comprising leveling the build material spread over the platform.

14. The process of claim 13, comprising simultaneously spreading and leveling the build material over the platform.

* * * * *